United States Patent
Wang et al.

(10) Patent No.: US 9,469,366 B2
(45) Date of Patent: Oct. 18, 2016

(54) DRAW-BAR BOX TYPE PORTABLE FOLDING ELECTRO-TRICYCLE WITH FOLDING CHAIR FUNCTION

(71) Applicants: Jianmin Wang, Beijing (CN); Sumi Wang, Surrey (GB)

(72) Inventors: Jianmin Wang, Beijing (CN); Sumi Wang, Surrey (GB)

( * ) Notice: Subject to any disclaimer, the term of this patent is extended or adjusted under 35 U.S.C. 154(b) by 0 days.

(21) Appl. No.: 14/871,655

(22) Filed: Sep. 30, 2015

(65) Prior Publication Data

US 2016/0016629 A1    Jan. 21, 2016

Related U.S. Application Data

(63) Continuation-in-part of application No. PCT/CN2014/073223, filed on Mar. 11, 2014.

(30) Foreign Application Priority Data

Apr. 1, 2013 (CN) .......................... 2013 2 0156454

(51) Int. Cl.
| | |
|---|---|
| *B62D 61/00* | (2006.01) |
| *B62K 15/00* | (2006.01) |
| *B62K 5/06* | (2006.01) |
| *B62K 5/027* | (2013.01) |
| *B62K 13/08* | (2006.01) |

(52) U.S. Cl.
CPC ............. *B62K 15/008* (2013.01); *B62K 5/027* (2013.01); *B62K 5/06* (2013.01); *B62K 13/08* (2013.01); *B62K 15/00* (2013.01); *B62K 2015/003* (2013.01); *B62K 2204/00* (2013.01)

(58) Field of Classification Search
CPC .......... B62K 2015/003; B62K 15/006; B62K 19/46; B62K 15/00
USPC ........ 180/208, 209, 210, 211, 220; 280/655, 280/655.1
See application file for complete search history.

(56) References Cited

U.S. PATENT DOCUMENTS 4,094,374 A * 6/1978 Adams .................... B60K 1/00
                                                                 180/208
4,750,578 A * 6/1988 Brandenfels .......... B62B 5/0026
                                                                 180/13

(Continued)

FOREIGN PATENT DOCUMENTS

| CN | 2273277 | 1/1998 |
|---|---|---|
| CN | 2560548 | 7/2003 |
| CN | 201158433 | 12/2008 |
| CN | 101780828 | 7/2010 |
| CN | 102152831 | 8/2011 |
| CN | 103204209 | 7/2013 |
| EP | 1736400 | 12/2006 |
| JP | 2007261556 | 10/2007 |

OTHER PUBLICATIONS

Translation of the ISR for PCT priority document PCT/CN2014/073223.
English translation of the WO/ISA for PCT priority document PCT/CN2014/073223.

*Primary Examiner* — Toan To
(74) *Attorney, Agent, or Firm* — Brian C. Trask

(57) ABSTRACT

A portable foldable electric tricycle that can be folded to form a trolley suitcase shape and a chair includes a folding frame connecting a front wheel assembly and handlebar assembly to a seat. The front wheel assembly includes an electric motor to drive the front wheel. A backrest and rear wheel assembly are hinge connected with the seat by oppositely disposed four bar linkages. A stand is hinge connected to the seat. The folding frame, front wheel assembly and handlebar assembly can be folded to a position within the seat and the stand folded to a position in which it supports the seat to define the chair configuration of the electric tricycle. The backrest and rear wheel assembly can be folded to non-extended positions in which they are disposed adjacent the seat to define the trolley suitcase configuration of the case.

12 Claims, 4 Drawing Sheets

(56) References Cited

U.S. PATENT DOCUMENTS

| | | | |
|---|---|---|---|
| 8,490,765 B2* | 7/2013 | Lee | A45C 5/146 190/18 A |
| 8,511,406 B2* | 8/2013 | Anasiewicz | B62B 5/0033 180/19.1 |
| 8,776,932 B1* | 7/2014 | Bussinger | B62K 15/006 180/208 |
| 8,887,852 B2* | 11/2014 | Schaap | B62K 3/002 180/208 |
| 8,915,512 B2* | 12/2014 | Kim | B62K 15/00 280/287 |
| 2006/0038378 A1 | 2/2006 | Lee | |
| 2007/0051548 A1* | 3/2007 | Kosco | B62K 5/025 180/208 |
| 2014/0291959 A1* | 10/2014 | Yap | B62K 15/006 280/278 |
| 2016/0016634 A1* | 1/2016 | Thompson | B62K 15/008 301/124.2 |

* cited by examiner

DRAW-BAR BOX TYPE PORTABLE FOLDING ELECTRO-TRICYCLE WITH FOLDING CHAIR FUNCTION

RELATED APPLICATIONS

This application is a continuation-in-part of the PCT International Patent Application No. PCT/CN2014/073223, filed on Mar. 11, 2014, designating the United States of America, and which claims the benefit under 35 U.S.C. 119(a) of the filing date of Chinese Utility Model Application Serial No. 201320156454.9, filed Apr. 1, 2013, the contents of the entireties of which are incorporated by this reference.

FIELD OF THE INVENTION

The invention relates to a portable foldable electric tricycle, and more particularly, a portable foldable electric tricycle that can be folded to form a portable trolley suitcase shape and a chair.

BACKGROUND

Nowadays electric bicycles and electric tricycles have become popular transportation tools. To improve portability and storability, many folding electric bicycles and tricycles have emerged on the market. However, almost none of these folding electric vehicles meet the volume and weight requirements for carrying onto buses or trains.

Therefore, there is an urgent need to develop a foldable electric vehicle that is portable and can be carried onto buses or trains.

An object of the invention is to provide a portable and foldable electric tricycle that can be folded to form a chair or a trolley suitcase shape, so as to solve problems of inconvenience moving between buses, the underground (metro) and travel destinations.

BRIEF SUMMARY OF THE INVENTION

The invention provides a portable foldable electric tricycle foldable to form a chair or trolley suitcase shape, said electric tricycle comprising:
a seat having an interior space;
a foldable frame extending from said seat;
a handlebar assembly that is hinge connected to said foldable frame;
a front wheel assembly that is hinge connected to said foldable frame, said front wheel assembly comprising a front wheel and an electric motor to drive said front wheel;
a backrest;
two rear wheels;
respective four bar linkages pivot connecting said rear wheels and said backrest to said seat; and
a stand hinge that is hinge connected to said seat,
wherein said handlebar assembly and front wheel assembly can be folded from respective extended use positions towards said foldable frame to respective collapsed positions and said foldable frame together with said handlebar assembly and front wheel assembly in said collapsed positions can be folded into said interior space to a stored position,
wherein with said foldable frame, handlebar assembly and front wheel assembly in said stored position, said stand can be pivoted to a supporting position whereby in cooperation with said rear wheels said stand supports said seat to form said chair, and
wherein said four bar linkages are configured to permit said back rest and rear wheels to pivot from respective extended use positions towards said seat to respective retracted positions, whereby with said foldable frame, handlebar assembly and front wheel assembly in said stored position said electric tricycle forms a trolley suitcase shape.

Embodiments of the invention comprise a portable foldable electric tricycle that can be folded to form a trolley suitcase shape or a chair, the foldable electric tricycle comprising a controlling handlebar 10, a front wheel 7, a seat case 1, rear wheels 17 and a foldable frame 2.

Both rear ends of the foldable frame 2 are hinged to a front of the seat case 1 and a lower front end of the foldable frame 2 is hinged to a foldable front wheel base 3. A hook locking component 4 is attached to a front end of the foldable front wheel base 3, a front wheel fork 5 is secured to a lower part of the folding wheel base 3, a front wheel torque transmission male component 6 is placed at an upper part of the front wheel fork 5, a lower part of the front wheel fork 5 mounts the front wheel 7, a drive motor 701 is installed at the middle of the front wheel 7, the front end of the foldable frame 2 is connected to a foldable handlebar base 9 and the controlling handlebar 10 is installed on an upper end of the foldable handlebar base 9. A handlebar torque transmission female component 12 is attached to a lower end of the controlling handlebar 10, and a latch hook 11 is installed to a front of the foldable handlebar base 9.

When folded into a tricycle state, the foldable frame 2 is folded to the front of the seat case 1, the controlling handlebar 10 is folded to an upright position, and the front wheel fork 5 is folded to an upright position. The foldable handlebar base 9, the foldable front wheel base 3 and foldable frame 2 are locked together by snapping the hook locking component 4 and the latch hook 11. The front wheel torque transmission female component 6 at the upper end of the front wheel fork 5 is interlocked with the handlebar torque transmission male component 12 at the lower end of the controlling handlebar 10.

A backrest 14 is hinged to an upper end of the seat case 1 at a backrest folding joint 142, as well as hinged to a connecting rod 15 at the backrest edge joint 143. A foldable rear wheel stand 16 is hinged to a lower end of the seating base 1 at a rear wheel stand hinge joint 161, and the rear wheels 17 are attached to the foldable rear wheel stand 16. A lower end of the foldable rear wheel stand 16 is hinged to the connecting rod 15 at a rod lower end hinge joint 151. A front end of an elastic pushing rod 18 is hinged to the lower part of the backrest 14 at the backrest edge joint 143. The elastic pushing rod 18 is hinged to a back of seat case 1 at a pushing rod stopping joint 181.

A backrest connecting rod 141 between the backrest folding joint 142 and the backrest edge joint 143, the connecting rod 15, the foldable rear wheel stand 16 and the seat case between the rear wheel stand hinge joint 161 and the backrest folding joint 142 (indicated by dashed line 101 FIG. 3) form a four bar linkage. The seat case 1 between the backrest folding joint 142 and the rear wheel stand hinge point 161 forms a fixed link of the four bar linkage.

A foldable beam 13 is hinged to the front of the seat case 1.

Two opposite foldable footrests 8 are attached to opposite outer sides of the front wheel fork 5.

A motor speed adjuster 19 is installed on the controlling handlebar 10.

A reflective device 144 is attached to the back of the backrest 14.

Compared with the existing technology offerings on the market, the portable foldable electric tricycle has the following advantages. As the portable foldable electric tricycle can be easily folded into a normal trolley suitcase shape and size, making it convenient for users to take onto buses and trains. Instead of driving a car downtown, if the user takes the option of riding the electric tricycle, folding it to the trolley suitcase shape when taking public transport, then riding it again as tricycle to their office or other destinations downtown, traffic congestion and air pollution problems in urban areas will be reduced significantly. Furthermore, it will save a huge amount of energy and money. In addition, when folded to the trolley suitcase shape, its volume is largely reduced. This combined with the wheel-dragging function of the trolley suitcase enables it to enter offices, hotels and shopping malls with the user. Compared with driving a car, the portable foldable electric tricycle can be kept by the side of the user at all times, which reduces the chance of it getting lost and saves parking spaces in urban areas. In addition, the portable foldable electric tricycle can also be folded to a chair mode, which further increases its applications.

Figure 1:
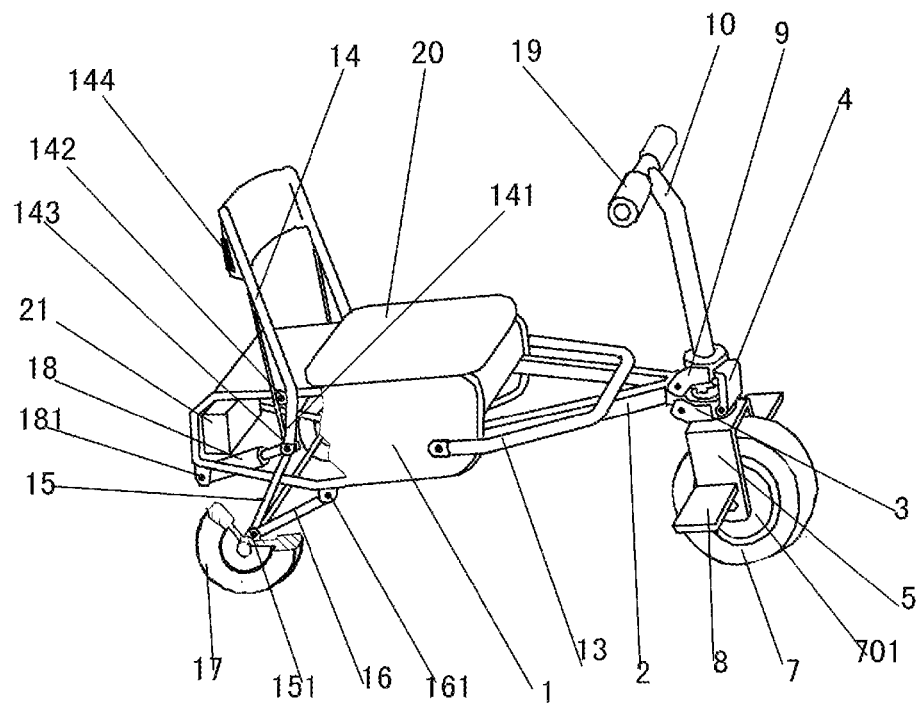
FIG. 1 is a schematic view of a portable foldable tricycle according to the invention.

DRAWINGS CODE DETAILS (1) seat case
(101) dashed line
(2) foldable frame
(3) foldable front wheel base
(4) hook locking component
(5) front wheel fork
(6) front wheel torque transmission female component
(7) front wheel
(701) drive motor
(8) foldable footrest
(9) foldable handlebar base
(10) controlling handlebar
(11) latch hook
(12) handlebar torque transmission male component
(13) foldable beam
(14) backrest
(141) backrest connecting rod
(142) backrest folding joint
(143) backrest edge joint
(144) reflective device
(15) connecting rod
(151) rod lower end hinge joint
(16) foldable rear wheel stand
(161) rear wheel stand hinge joint
(17) rear wheel
(18) elastic pushing rod
(181) pushing rod stopping joint
(19) motor speed adjuster
(20) seating cushion
(21) battery

DETAILED DESCRIPTION OF THE ILLUSTRATED EMBODIMENT(S)

Figure 2:
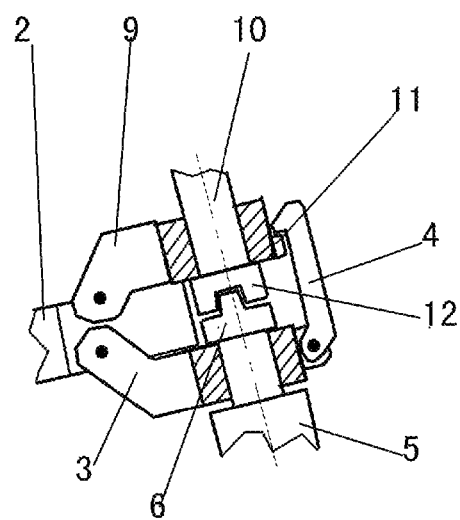
FIG. 2 is a cross-sectional view of connections between a foldable frame, foldable front wheel base, hook locking component, front wheel fork, front wheel torque transmission female and male component, foldable handlebar base and latch hook of the foldable tricycle.

Referring to the drawings and initially to FIGS. 1 and 2, both rear ends of the foldable frame 2 are hinged to the front of the seat case 1, the front end of the foldable frame 2 is hinged to a foldable front wheel base 3. A hook locking component 4 is attached to the front end of the foldable front wheel base 3 and a front wheel fork 5 is secured to the lower part of the folding wheel base frame 3. A front wheel torque transmission female component 6 sits on the upper part of the front wheel fork 5. The lower part of the front wheel fork 5 mounts the front wheel 7 and a drive motor 701 is installed at the middle of the front wheel 7. The front end of the foldable frame 2 is also connected to the foldable handlebar base 9, the controlling handlebar 10 is installed onto the upper end of foldable handlebar base 9. A motor speed adjuster 19 is installed on the controlling handlebar 10. A handlebar torque transmission male component 12 is attached to the lower end of controlling handlebar 10, and a latch hook 11 is installed to the front of the foldable handlebar base 9.

When folded into a tricycle state from the trolley suitcase shape, the foldable frame 2 is folded to project from the front of the seat case 1, the controlling handlebar 10 is folded to an upright position and the front wheel fork 5 is folded to an upright position. The foldable handlebar base 9 and the foldable front wheel base 3 are locked together in these extended use positions and to the foldable frame 2 by snapping the hook locking component 4 and the latch hook 11. The front wheel torque transmission female component 6 at the upper end of the front wheel fork 5 is interlocked with the handlebar torque transmission male component 12 at the lower end of the controlling handlebar 10. When the controlling handlebar 10 is turned at an angle, the torque will be transmitted to front wheel 7 through handlebar torque transmission male component 12 and front wheel torque transmission female component 6 so that the tricycle will turn accordingly.

To fold the tricycle to the trolley suitcase shape, the foldable frame 2, the connecting parts of the associated controlling handlebar 10 and the front wheel 7 are folded to a position inside the seat case 1. The backrest 14 and the rear wheel 17 are folded towards the outside of the seat case 1. Thus the two rear wheels 17 become the wheels for the trolley suitcase and the seat case 1 forms the body of the trolley suitcase.

The procedure of folding the foldable frame 2, the connecting parts of the associated controlling handlebar 10, and the front wheel 7 to the inside of the seat case 1 is achieved by the following steps illustrated by FIGS. 2 to 5. The hook locking component 4 is removed from the latch hook 11 and the controlling handlebar 10 and the front wheel fork 5 are folded towards the foldable frame 2.

Figure 3:
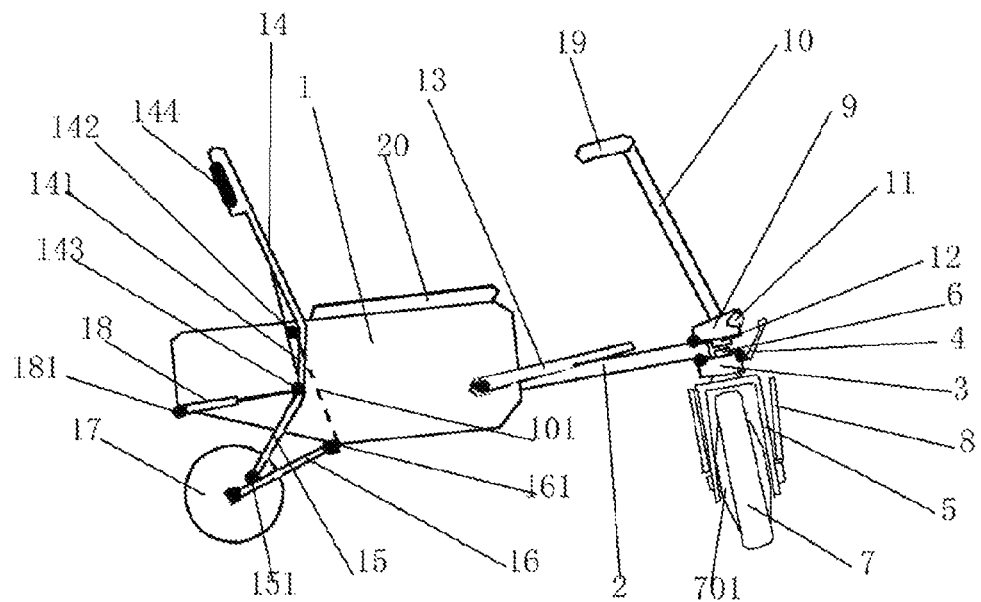
FIG. 3 is a schematic view showing a first step of folding the foldable tricycle to a trolley suitcase shape.
Figure 4:
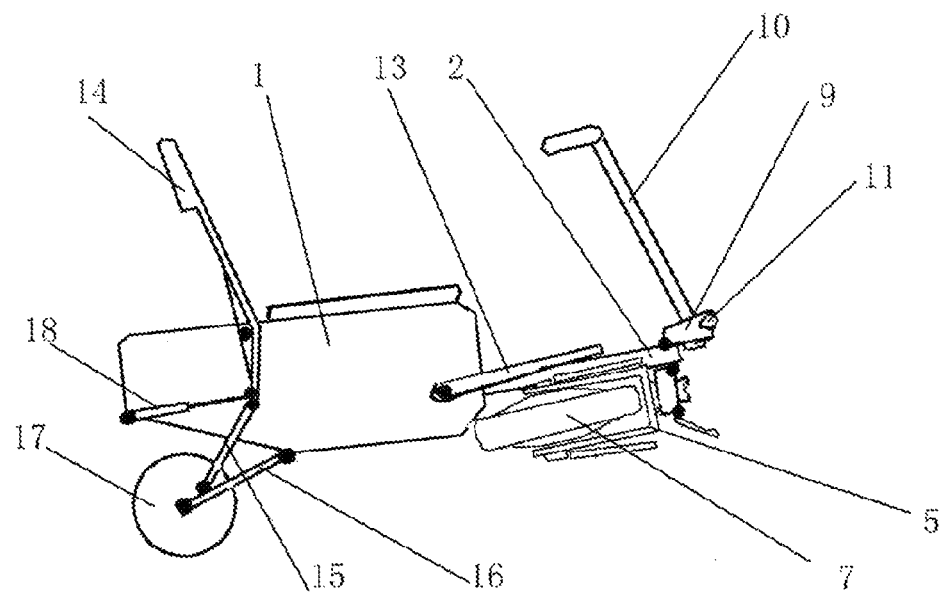
FIG. 4 is a schematic view showing a second step of folding the foldable tricycle to the trolley suitcase shape.
Figure 5:
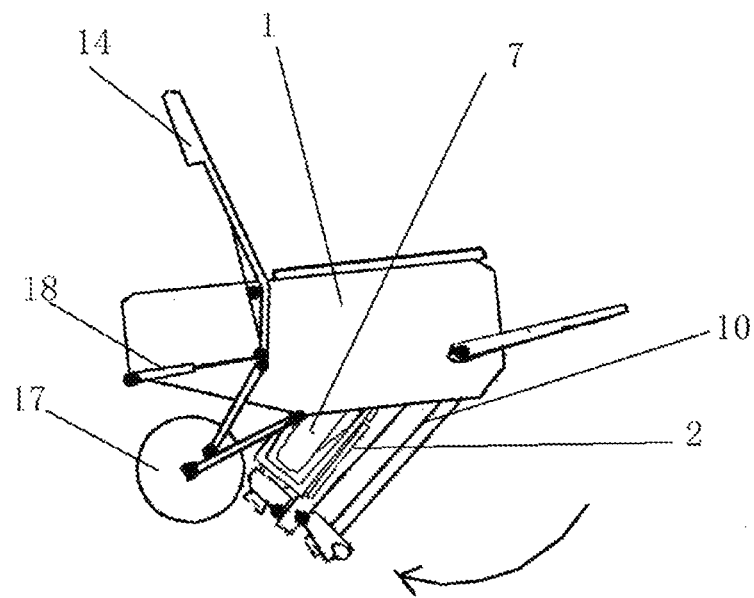
FIG. 5 is a schematic view showing a third step of folding the foldable tricycle to the trolley suitcase shape.

With the handlebar torque transmission male component 12 front wheel torque transmission female component 6 detached from one another, the footrests 8 are folded towards front wheel fork 5, which can rotate approximately 90 degrees about the vertical axis (shown in FIG. 3)

The front wheel fork 5 is folded approximately 90 degrees towards and close parallel beneath the foldable frame 2 (shown in FIG. 4) and the controlling handlebar 10 is folded to a position parallel to and above the foldable frame 2. The front wheel fork 5 and controlling handlebar 10 are thus folded from their extended positions for use in tricycle mode to respective collapsed positions.

The foldable frame 2 together with the front wheel fork 5 and the controlling handlebar 10 are folded towards the underneath of the seat case 1 approximately 180 degrees. Thus all three parts are completely folded into the hollow interior of the seat case 1 (shown in FIGS. 4 and 5).

To eliminate separate folding operations, the backrest 14 frames and the rear wheel 17 are designed as a group defining a four bar linkage.

Figure 6:
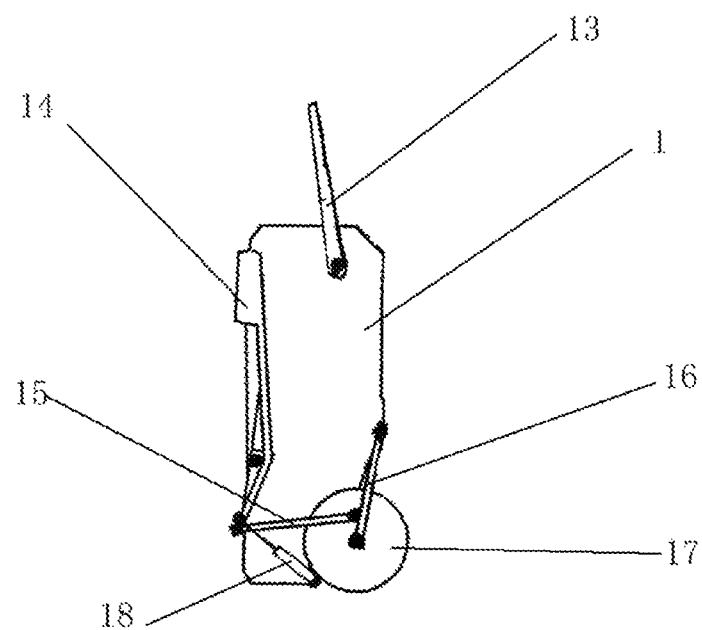
FIG. 6 is a schematic view of the foldable tricycle in folded to form the trolley suitcase shape.

The four bar linkage between the backrest 14 and the rear wheel 17 as well as their folding towards seat case 1 are illustrated by FIGS. 1, 3 and 6. The backrest 14 is hinged to the seat case 1 at the left and right sides of the frame. Both sides are completely symmetrical, and so are the connected parts. Therefore only one side is described below:

The backrest 14 is hinged to the upper end of the seat case 1 at a backrest folding joint 142, as well as hinged to a connecting rod 15 at the backrest edge joint 143. A foldable rear wheel stand 16 is hinged to the lower end of the seating base 1 at a rear wheel stand hinge joint 161, and the rear wheels 17 are attached to the foldable rear wheel stand 16. The lower end of the foldable rear wheel stand 16 is hinged to the connecting rod 15 at a rod lower end hinge joint 151. The front end of an elastic pushing rod 18 is hinged to the lower part of the backrest 14 at the backrest edge joint 143, and the elastic pushing rod 18 is hinged to the back of seat case 1 at a pushing rod stopping joint 181.

As indicated in FIG. 3, a backrest connecting rod 141 between the backrest folding joint 142 and the backrest edge joint 143, the connecting rod 15, the foldable rear wheel stand 16 and the seat case 1 between the rear wheel stand hinge joint 161 and the backrest folding joint 142 (indicated by the dashed line 101 in FIG. 3) form the four bar linkage. The seat case between the backrest folding joint 142 and the rear wheel stand hinge point 161 defines a fixed link of the four bar linkage.

Figure 7:
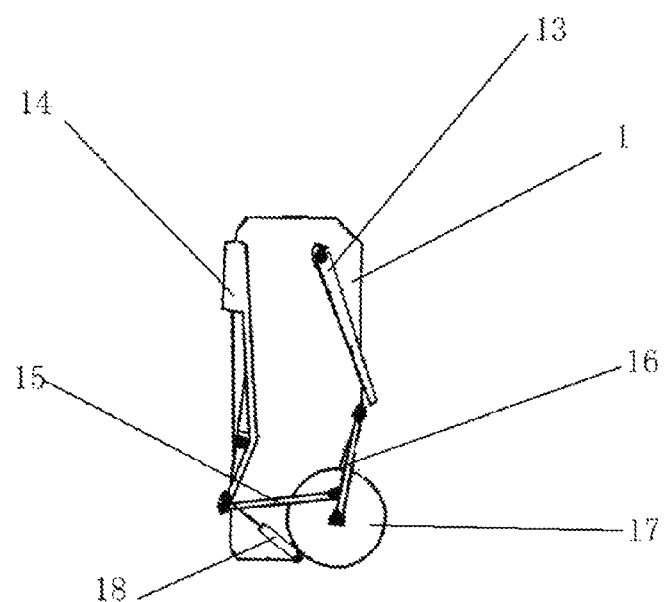
FIG. 7 is a schematic view showing the shape of the foldable tricycle when folded in transportation or storage mode.

In order to fold the vehicle to the tricycle or chair state, the backrest 14 is manually folded away from the seat case 1. Because of the interlocking thrust via connecting rod 15, the lower end of the foldable rear wheel stand 16 is pushed away from the retracted, or docking, position adjacent the seat case 1 shown in FIGS. 6 and 7). Pushed by the elastic pushing rod 18, both the backrest 14 and the foldable rear wheel stand 16 will stably maintain this expanded state.

In order to fold the foldable tricycle from the tricycle or chair state to the trolley suitcase shape, the backrest 14 is manually folded towards the seat case 1. Because of the interlocking thrust via connecting rod 15, the lower end of the foldable rear wheel stand 16 is dragged towards the seat case 1. Pushed by the elastic pushing rod 18, both the backrest 14 and the foldable rear wheel stand 16 will stably maintain this closed together state.

Figure 8:
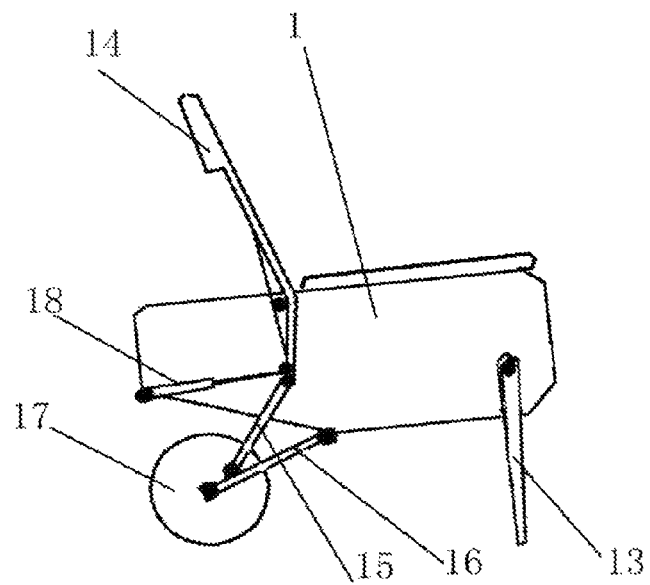
FIG. 8 is a schematic view of the foldable tricycle folded to form a chair.

The foldable beam, or stand, 13 is hinged to the front of the seat case 1. When the foldable tricycle is folded into trolley suitcase shape, the foldable beam 13 is folded parallel to the longitudinal axis of the seat case 1 so that it projects forwardly of the seat case. Thus the foldable beam 13 acts as the handlebar of the trolley suitcase. When folded into the chair state, the foldable beam 13 is folded to a position vertically under the seat case 1. Thus the foldable beam 13 acts as the front legs of chair. When folded to the transportation or storage state, the foldable beam 13 is further folded towards the seat case 1. Thus the foldable beam 13 takes little space for easy transportation or storage (shown in FIGS. 6 to 8).

The vehicle is powered by battery 21, which is placed inside the seat case 1. A seating cushion 20 is attached to the surface of the seat case 1, as shown in FIG. 1.

In order not to affect, or injure, other passengers when travelling on public transportation, all the outer corners of the seat case 1 are chamfered, as shown in FIG. 1.

For traffic safety, reflective device 144 is installed to the back of backrest 14 of the rear side of device 14 with reflective means 144, as shown in FIG. 1.

What is claimed is:

1. A portable foldable electric tricycle that can be folded to form a trolley suitcase shape or a chair, said electric tricycle comprising
    a controlling handlebar,
    a seat case,
    a foldable frame,
    a front wheel, and
    rear wheels,
    wherein:
    said foldable frame has two rear end portions and both rear end portions of the foldable frame are hinged to a front of the seat case,
    a front end of the foldable frame is hinged to a foldable front wheel base,
    a hook locking component is attached to a front end of the foldable front wheel base,
    a front wheel fork is secured to a lower part of the foldable front wheel base,
    a front wheel torque transmission male component is placed at an upper part of the front wheel fork,
    the front wheel is mounted to a lower part of the front wheel fork,
    a drive motor is installed at the middle of the front wheel,
    the front end of the foldable frame is connected to a foldable handlebar base,
    the controlling handlebar is installed onto an upper end of foldable handlebar base,
    a motor speed adjuster is installed on the controlling handlebar,
    a handlebar torque transmission female component is attached to a lower end of the controlling handlebar,
    a latch hook is installed to the front of the foldable handlebar base,
    a backrest is hinged to an upper end of the seat case at a backrest folding joint and to a connecting rod at a backrest edge joint,
    a foldable rear wheel stand is hinged to a lower end of the seat case at a rear wheel stand hinge joint and the rear wheels are attached to the foldable rear wheel stand,
    a lower end of the foldable rear wheel stand is hinged to the connecting rod at a rod lower end hinge joint,
    a front end of an elastic pushing rod is hinged to a lower part of the backrest at the backrest edge joint,
    the elastic pushing rod is hinged to the back of the seat case at a pushing rod stopping joint, a backrest connecting rod between the backrest folding joint and the backrest edge joint, the connecting rod, the foldable rear wheel stand and the seat case between the rear wheel stand hinge joint and the backrest folding joint define a four bar linkage, a foldable beam is hinged to the front of the seat case, and when folded into a tricycle state from the trolley suitcase shape, the foldable frame is folded to the front of the seat case, the controlling handlebar is folded to an upright position, the front wheel fork is folded to an upright position, the foldable handlebar base, the foldable front wheel base and foldable frame are interlocked by snapping the hook locking component and the latch hook, and the front wheel torque transmission male component at the upper end of the front wheel fork is interlocked with the handlebar torque transmission female component at the lower end of the controlling handlebar.

2. A portable foldable electric tricycle as claimed in claim 1, wherein two oppositely disposed foldable footrests are attached to respective sides of the front wheel fork.

3. A portable foldable electric tricycle as claimed in claim 1, wherein a motor speed adjuster is installed to the controlling handlebar.

4. A portable foldable electric tricycle as claimed in claim 1, wherein a reflective device is attached at a back side of the backrest.

5. A portable foldable electric tricycle foldable to form a chair or trolley suitcase shape, said electric tricycle comprising:
   a seat having an interior space;
   a foldable frame extending from said seat;
   a handlebar assembly that is hinge connected to said foldable frame;
   a front wheel assembly that is hinge connected to said foldable frame, said front wheel assembly comprising a front wheel and an electric motor to drive said front wheel;
   a backrest;
   two rear wheels;
   respective four bar linkages pivot connecting said rear wheels and said backrest to said seat, wherein each of said four bar linkages comprises a wheel support rod that extends from a first hinge connection that connects said wheel support rod to said seat and is connected with the respective rear wheel, a back rest support rod that is hinge connected to said seat by a second hinge connection that is spaced apart from said first hinge connection, a connecting rod hinge connected to said backrest support rod and said wheel support rod by third and fourth hinge connections respectively and said seat between said first and second hinge connections;
   an elastic biasing strut that is hinge connected to the seat and to the third hinge connection; and
   a stand hinge that is hinge connected to said seat, wherein said handlebar assembly and front wheel assembly can be folded from respective extended use positions towards said foldable frame to respective collapsed positions and said foldable frame together with said handlebar assembly and front wheel assembly in said collapsed positions can be folded into said interior space to a stored position, wherein with said foldable frame, handlebar assembly and front wheel assembly in said stored position, said stand can be pivoted to a supporting position whereby in cooperation with said rear wheels said stand supports said seat to form said chair, wherein said four bar linkages are configured to permit said back rest and rear wheels to pivot from respective extended use positions towards said seat to respective retracted positions, whereby with said foldable frame, handlebar assembly and front wheel assembly in said stored position said electric tricycle forms said trolley suitcase shape, and wherein said handlebar assembly and front wheel assembly define a male member and a female member that interengage when said handlebar assembly and front wheel assembly are in said extended use positions to transfer a steering torque from said handlebar assembly to said front wheel assembly.

6. A portable foldable electric tricycle as claimed in claim 5, wherein said stand is pivotable from said supporting position to a position projecting from said seat to form a towing handle for said electric tricycle when in said trolley suitcase shape.

7. A portable foldable electric tricycle as claimed in claim 5, wherein said front wheel assembly comprises a fork to support said front wheel and oppositely directed foldable footrests attached to said fork.

8. A portable foldable electric tricycle as claimed in claim 5, wherein said handlebar assembly is provided with a motor speed adjustor configured to permit a rider to control the speed of said electric motor.

9. A portable foldable electric tricycle as claimed in claim 5, wherein when in said collapsed positions said handlebar assembly and front wheel assembly lie in oppositely disposed relation and said foldable frame extends between said handlebar and front wheel assemblies.

10. A portable foldable electric tricycle as claimed in claim 5, further comprising a latching hook assembly for releasably securing said handlebar assembly to said front wheel assembly when said handlebar assembly and front wheel assembly are in said extended use positions.

11. A portable foldable electric tricycle as claimed in claim 5, further comprising a battery to power said electric motor, said battery housed in said interior space.

12. A portable foldable electric tricycle as claimed in claim 5, wherein said stand comprises a U-shaped member having respective arms hinge connected to opposed sides of said seat.

* * * * *